United States Patent Office 3,034,826
Patented May 15, 1962

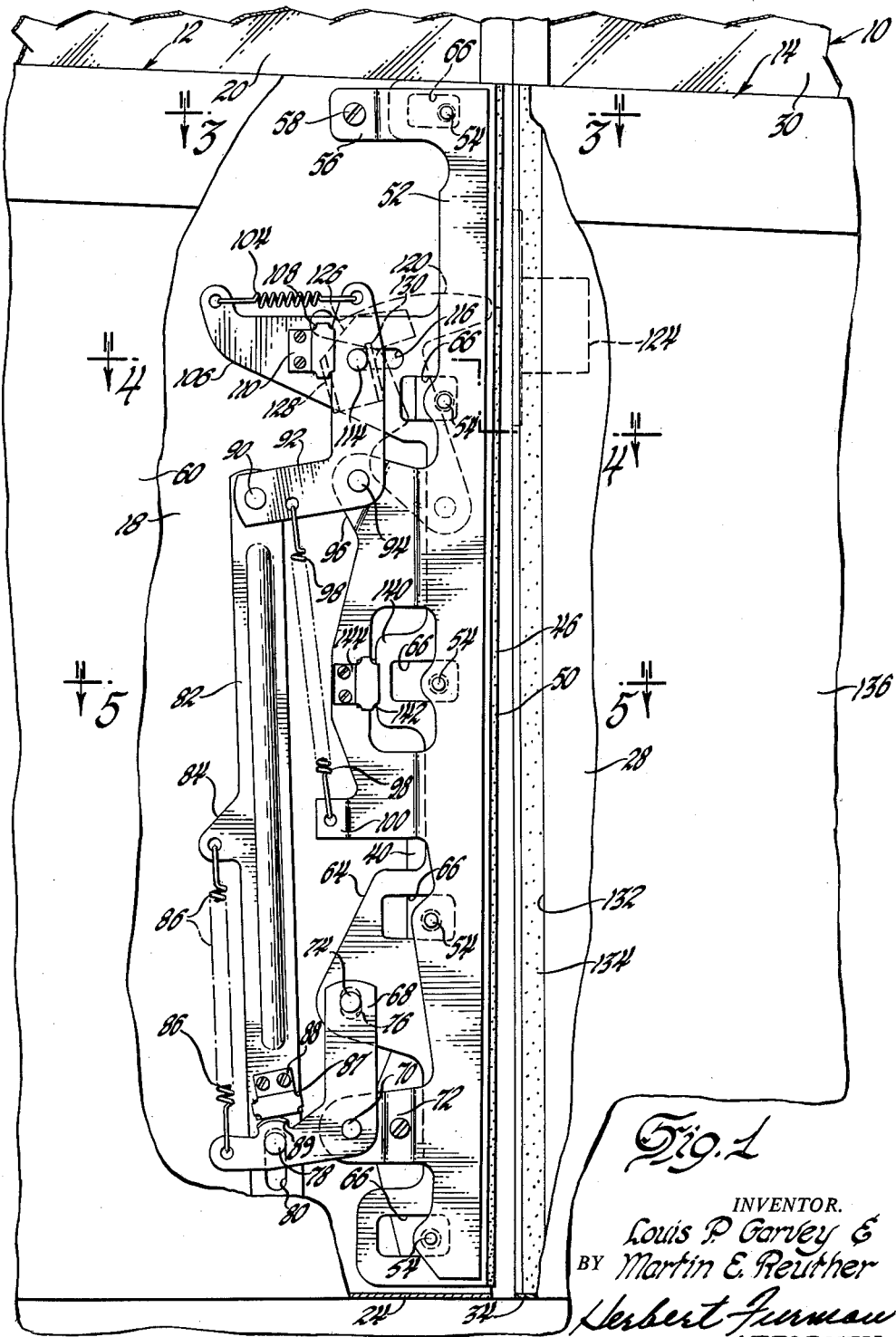

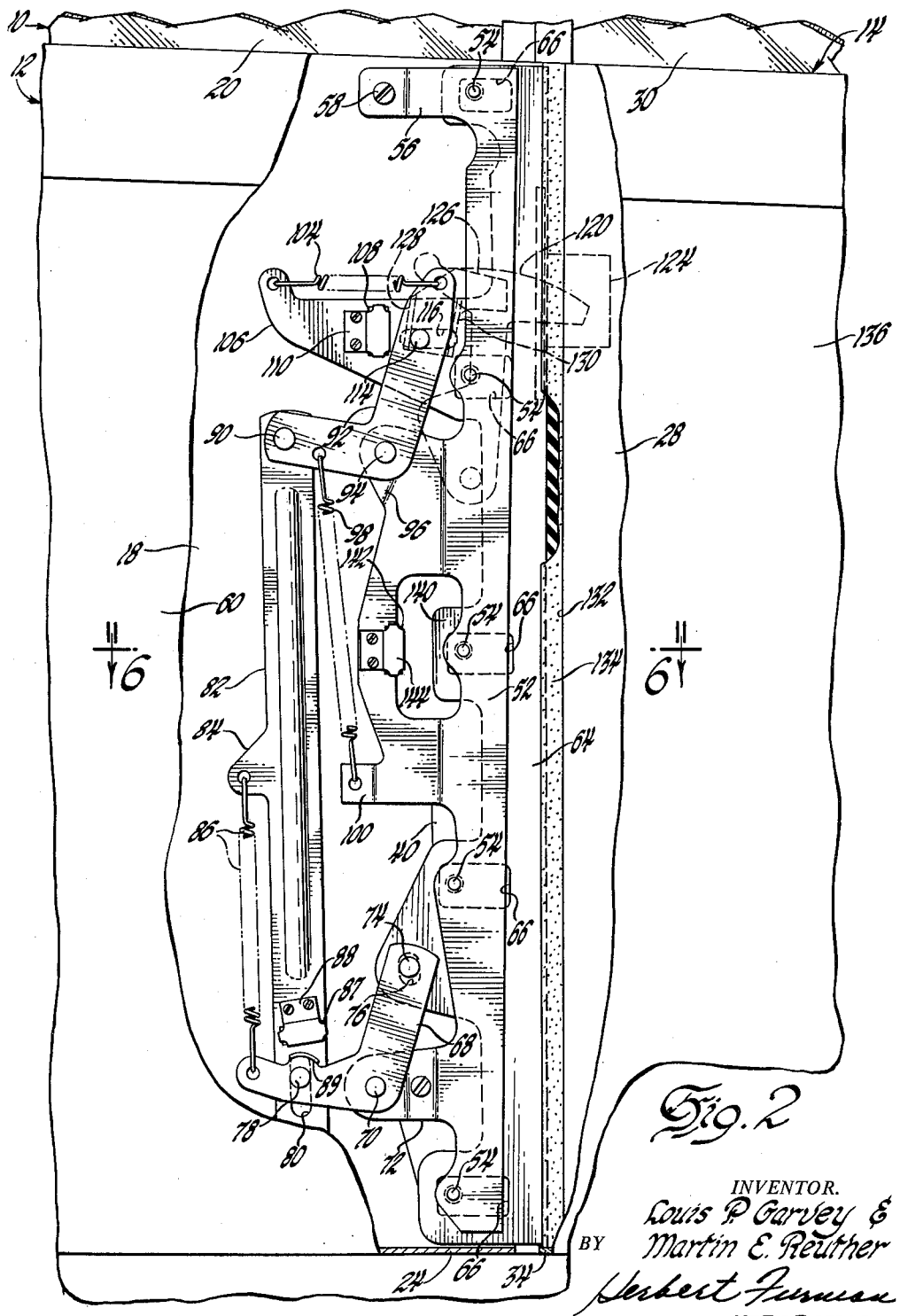

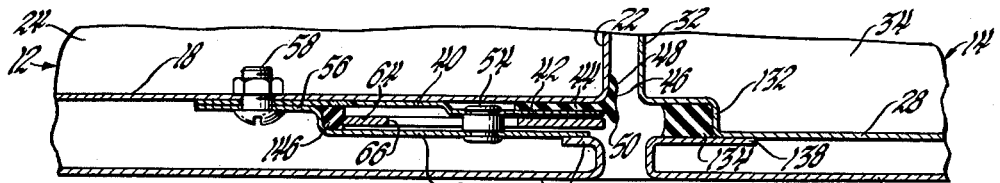
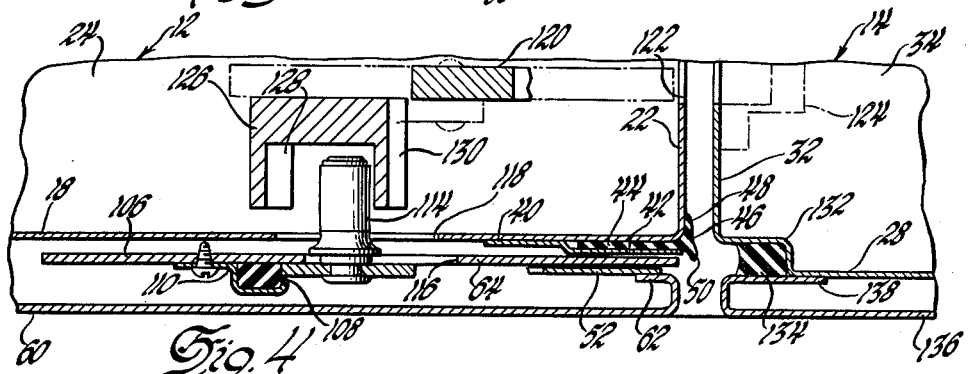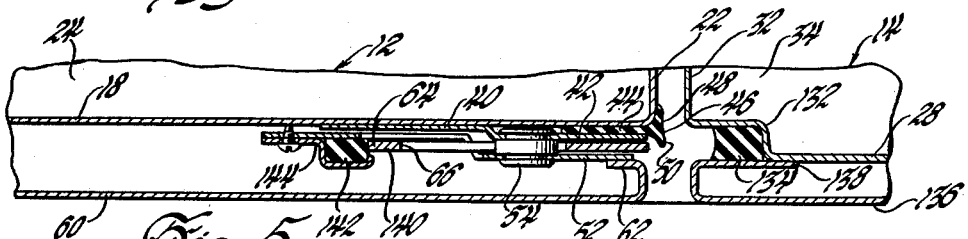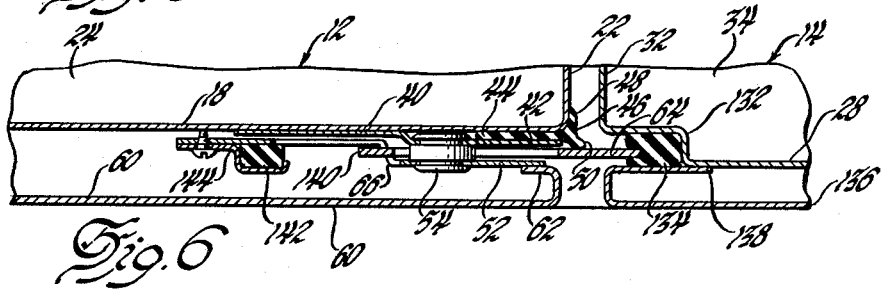

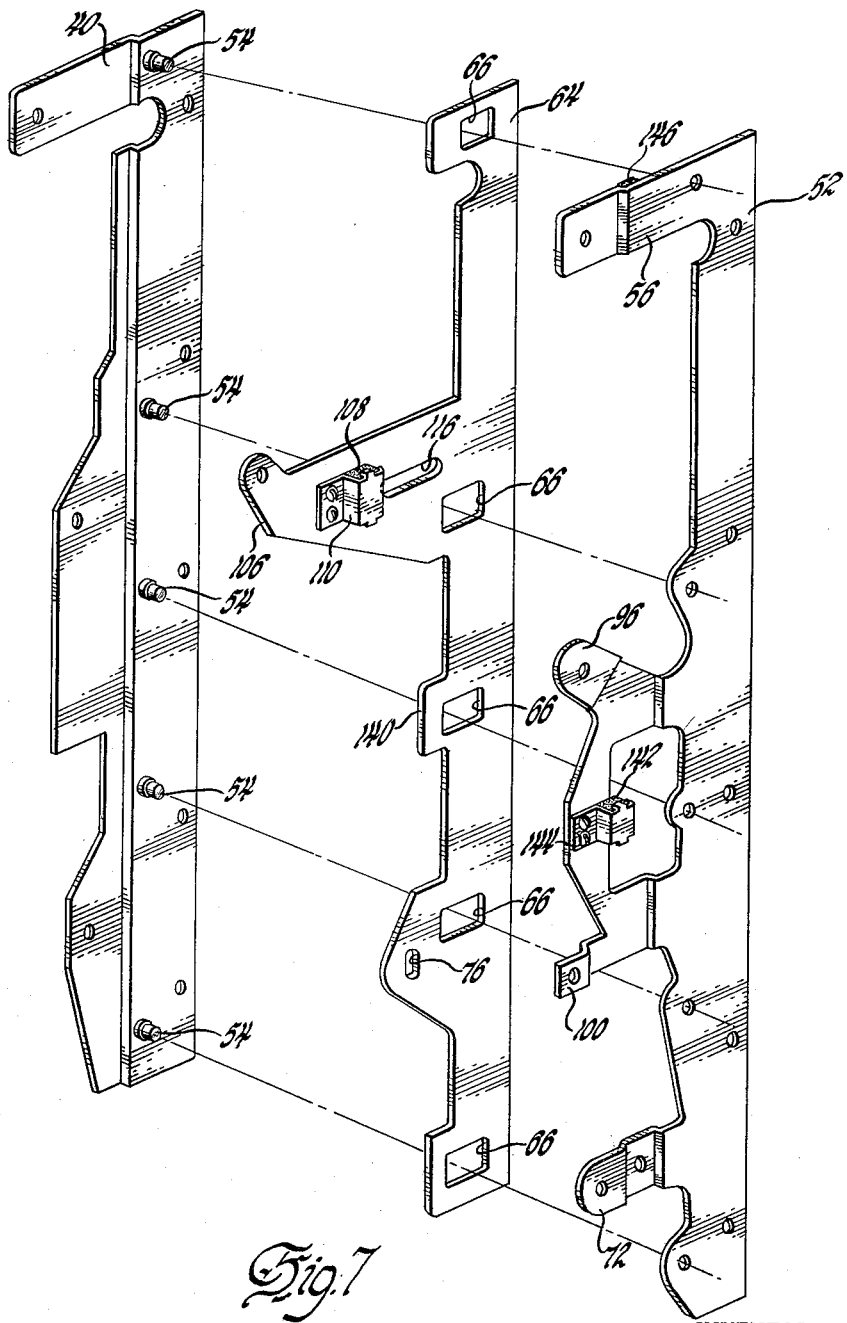

3,034,826
CLOSURE SEALING ARRANGEMENT
Louis P. Garvey, Birmingham, and Martin E. Reuther, Detroit, Mich., assignors to General Motors Corporation, Detroit, Mich., a corporation of Delaware
Filed June 26, 1959, Ser. No. 823,121
10 Claims. (Cl. 296—44)

This invention relates to vehicle body sealing arrangements and more particularly to a vehicle body closure sealing arrangement.

The sealing arrangement of this invention is particularly intended for use with the pillarless type of four-door vehicle body. In this type of body there is no pillar between the free swinging edges of the front and rear doors and these doors are usually latched to each other and to the body sill when the doors are in a closed and latched position. Since the doors are each movable independently between open and closed positions, it is somewhat difficult to provide a sealing arrangement which will permit this movement of the doors relative to each other or permit simultaneous movement of the doors and which will also adequately seal the interior of the body when the doors are in a closed and latched position.

This invention provides such a sealing arrangement which is coordinated with opening and closing movement of the doors and which adequately seals the interior of the body against the entry of foreign material when both doors are in a closed and latched position.

In the preferred embodiment of the invention, a sealing blade member is floatingly supported on one of the doors for generally sliding movement between extended and retracted positions with respect to the free edge of the one door. When the blade member is in a retracted position, it is out of the path of swinging movement of the free edge of the one door relative to the other door or of the other door relative to the one door, and when the member is in an extended position, it abuts a weatherstrip on the other door so as to seal the interior of the body. Since the blade member is floatingly supported on the one door, it can tilt slightly in vertical directions if necessary in order to abut the sealing member mounted on the other door. Movement of the blade member between its extended and retracted positions is controlled by the door latching arrangement which latches the one door to the other door. Thus, upon opening movement of either door, the blade member is automatically moved to its retracted position, and upon closing movement of either door and movement of the latch bolt to a partially latched position, the blade member is automatically moved to its extended position. Movement of the blade member to its extended position is delayed until the doors are in a partially latched position to insure that the doors are aligned so that there will be no damage to the blade member or to the other door upon movement of the blade member.

The primary object of this invention is to provide an improved vehicle body sealing arrangement. Another object of this invention is to provide an improved vehicle body door seal which is movable between extended and retracted positions with respect to the free swinging edge of a vehicle door and is coordinated with operation of the vehicle door latch. A further object of this invention is to provide an improved sealing arrangement for sealing the juxtaposed free swinging edges of a pair of vehicle body doors in the closed and latched position of each. Yet another object of this invention is to provide an improved sealing arrangement for use in four-door pillarless body sedans to seal the juxtaposed free swinging edges of the vehicle doors in the closed and latched position thereof and which will permit either door to be moved to open position without interference.

These and other objects of this invention will be readily apparent from the following specification and drawings, wherein:

FIGURE 1 is a partially broken away partial side elevational view of a pillarless body four-door sedan embodying a sealing arrangement according to this invention, with the doors being shown in the closed and unlatched position thereof and with the blade member being shown in the retracted position thereof;

FIGURE 2 is a view similar to FIGURE 1 showing the doors in the closed and latched position thereof and the blade member in the extended position thereof;

FIGURE 3 is an enlarged sectional view taken generally along the plane indicated by line 3—3 of FIGURE 1;

FIGURE 4 is an enlarged sectional view taken generally along the plane indicated by line 4—4 of FIGURE 1;

FIGURE 5 is an enlarged sectional view taken generally along the plane indicated by line 5—5 of FIGURE 1; and FIGURE 6 is an enlarged sectional view taken generally along the plane indicated by line 6—6 of FIGURE 2.

FIGURE 7 is an exploded view showing the structural relationship of the blade member and the retainer and bracket.

Referring now particularly to FIGURE 1 of the drawings a vehicle body 10 of the four-door pillarless sedan type includes a front door 12 hinged at its forward edge, not shown, to the body and a rear door 14 hinged at its rearward edge, not shown, to the body. Since no pillar is provided between the free swinging edges of doors 12 and 14, these edges are located in generally closely spaced juxtaposed relationship as can be seen in FIGURES 3 through 6 of the drawings when the doors are in their closed position. The front door 12 generally includes a door outer panel, not shown, and a door inner panel 18 located in spaced relationship thereto to provide a window receiving well for the door window 20. The door outer and inner panels are spaced by the front end wall of the door, not shown, the rear end wall 22 and the bottom wall 24 of the door. The rear door 14 is of like construction and includes a door outer panel, not shown, and a spaced door inner panel 28 which provide a well for the rear door window 30, with the panels being spaced by a front end wall 32, a bottom wall 34 and a rear end wall, not shown. Walls 22 and 32 generally define the free swinging edges of doors 12 and 14, respectively.

Referring now particularly to drawings, the sealing arrangement of this invention will be described. Before proceeding with a description of the sealing arrangement, it will be briefly noted that the blade member is mounted on the front door 12 and sealingly engages the rear door 14 when the doors are in a closed and latched position, with the movement of the blade member being coordinated with operation of the vehicle door latch which latches doors 12 and 14 together at the free swinging edges thereof. It should also be mentioned that the blade member may be mounted on the rear door 14 to seal against the front door 12 if desirable or necessary.

An elongated retainer member 40 is suitably secured to the inner panel 18 of door 12 adjacent the end wall 22 thereof. Retainer 40 includes an offset flange 42 which clamps a mounting flange 44 of a door weatherstrip 46 against panel 18 to thereby mount the weatherstrip 46 on the body. Weatherstrip 46 is generally of T-shape and includes a lateral flange 48 which seals against the end wall 22 of door 12 and a flange 50 which is adapted to wipe against the blade member when moved to the extended position thereof as will be further described.

An elongated support bracket 52 overlies retainer 40 in spaced relationship thereto and is located and also mounted on the body by a plurality of spaced rivets 54 which interconnect the flange 42 of retainer 40 and bracket 52. As shown in FIGURE 1, of the drawings, five of these spacer rivets are provided although more or less may be provided if desirable. Bracket 52 includes an offset flange 56 at the upper end thereof bolted at 58 to the door inner panel 18 in order to provide an additional support means for the upper end of the bracket. As shown in FIGURES 3 through 6 of the drawings, an auxiliary door iner panel 60 may be mounted on door 12 in order to conceal the support bracket and retainer. Panel 60 may be provided with a return bent flange portion 62 which bears against the inner surface of the edge portion of bracket 52 and may be secured thereto if desired.

The retainer member 40 and the support bracket 52 generally provide a housing for the blade member 64 which is located therebetween and is floatingly supported by bracket 52 as will be further described. As best shown in FIGURE 1, of the drawings, the blade is provided with five spaced apertures 66 which receive and are equal in number to the spacer rivets 54 to allow the blade to move both horizontally and vertically, within limited distances, relative to the spacer rivets without interference.

A lower bell crank 68 is pivoted at 70 to an offset ear 72 of the support bracket 52. One leg of bell crank 68 mounts a pin 74 which is pivotally and slidably received within a generally vertically extending closed slot 76 in blade member 64. The other leg of bell crank 68 mounts a pin 78 which is pivotally and slidably received within an elongated generally vertically extending closed slot 80 provided in the lower end of a vertically shiftable link 82. Link 82 includes an apertured ear 84 and a coil torsion spring 86 is hooked between ear 84 and the other leg of bell crank 68 in order to bias pin 78 toward the upper end of slot 80 and bias bell crank 68 in a clockwise direction. A rubber bumper 87 is mounted within a bracket 88 bolted to link 82 and is adapted to engage a lateral arcuate foot 89 on the other leg of bell crank 68 under the action of spring 86 upon downward shifting movement of link 82 from its position of FIGURE 2 toward its position of FIGURE 1. Since the foot 89 is arcuate, it can be seen that the lower end of the link 82 and the other leg of bell crank 68 can pivot relative to each other about the axis of the pin 78 without interference when foot 89 is in engagement with bumper 87.

The upper end of link 82 is pivoted at 90 to one leg of an upper bell crank 92. Bell crank 92 is pivoted at 94 to an offset ear 96 of bracket 52 and a coil torsion spring 98 hooked between the one leg of bell crank 98 and an offset apertured ear 100 of the support bracket continuously biases bell crank 92 in a counterclockwise direction to normally bias link 82 downwardly.

A coil torsion spring 104 is hooked between the apertured other leg of bell crank 92 and an apertured laterally extending leg 106 of blade member 64 to normally bias the blade member to the right as viewed in FIGURE 1, toward the extended position thereof. A rubber bumper 108 mounted within a bracket 110 bolted to the leg 106 of the blade member is adapted to engage the other leg of bell crank 92 upon counterclockwise swinging movement of the bell crank from its position of FIGURE 2 towards its position of FIGURE 1. The other leg of bell crank 92 mounts an outwardly extending stud 114, FIGURE 4, which extends into the door well through a slot 116 in the blade member 64 and a slot 118 in the door inner panel 18.

Since the door latching mechanism which latches doors 12 and 14 together forms no part of this invention, the details of the latching mechanism are not shown nor described herein. Reference may be had to Serial No. 703,407, "Door Latch Mechanism" filed December 17, 1957, now Patent No. 2,935,351, Garvey et al., assigned to the assignee of this invention, for the details of the mechanism. As shown schematically in FIGURES 1 and 4 of the drawings, the latching mechanism includes a pivotally mounted latch bolt 120 which is movable between an unlatched position, as shown in FIGURE 1, and a latched position, as shown in FIGURE 2, wherein the bolt 120 extends through a suitable opening 122 in wall 22 into engagement with a striker 124 mounted on the edge wall 32 of door 14. As best shown in FIGURE 4 of the drawings, a generally U-shaped actuating guide member 126 is secured to the bolt 120 and receives the stud 114 between the opposite edge walls 128 and 130 thereof.

Referring now particularly to FIGURE 2 of the drawings, when doors 12 and 14 are in a closed and latched position, wherein bolt 120 is in latching engagement with striker 124, the engagement of wall 128 of guide 126 with stud 114 maintains bell crank 92 in the position shown against the action of spring 98 to thereby tension spring 104 and cause this spring to urge the upper end of the blade member 64 to the right or to extended position. When the bell crank 92 is in this position, link 82 is in its upper position to tension spring 86 and urge bell crank 68 clockwise about the pivot 70 thereof to thereby cause the bell crank 68 to also urge the lower end of the sealing member to the right or to extended position. As best shown in FIGURES 3 through 6 of the drawings, the inner panel 28 of door 14 is provided with a rabbetted edge 132 which mounts a weatherstrip 134. An auxiliary panel 136 similar to panel 60 overlies panel 28 and has a return bent flange portion 138 which seals against weatherstrip 134. When member 64 is urged to the right as viewed in FIGURE 2 by spring 104 and bell crank 68, it is urged into sealing engagement with weatherstrip 134, as best shown in FIGURE 6, to thereby seal the interior of the body. Additionally as shown in FIGURE 6, the blade member 64 will wipe past the flange 50 of weatherstrip 46 so as to further prevent any leakage or air passage to the interior of the body from between the inner panel 18 of door 12 and the panel 60.

It will be noted that the vertical support means for blade member 64 comprises the pin 114 and slot 116 and that the blade member can tilt in vertical directions, if necessary, about pin 74 or pin 114, or both, so as to continuously engage the weatherstrip 134 and provide a tight seal for the interior of the body.

In order to open either door 12 or door 14 or both doors, bolt 120 must be moved out of engagement with striker 124 to its unlatched position as shown in FIGURE 1 of the drawings. Assuming now that bolt 120 is moved toward unlatched position, bell crank 92 will swing counterclockwise about the pivot 94 thereof under the action of spring 98 as stud 114 engages and follows the movement of wall 128 of guide 126. After a few degrees of counterclockwise swinging movement of bell crank 92, the other leg thereof will move into engagement with the rubber bumper 108 to thereby shift the upper end of the blade member 64 to the left as viewed in FIGURE 2, toward retracted position with the spring 104 maintaining the other leg of the bell crank in engagement with the bumper 108.

It can also be seen that link 82 will be shifted downwardly upon counterclockwise swinging movement of bell crank 92 and that after a limited distance of downward shifting movement of the link, the foot 89 will move into engagement with the rubber bumper 87 under the action of spring 86. Thereafter, upon continued downward shifting movement of the link 82, the engagement of the foot 89 with the rubber bumper 87 will cause bell crank 68 to be swung counterclockwise about the pivot 70 thereof to thereby also shift the lower end of the blade member 64 to the left. The arrangement is such that the other leg of bell crank 92 engages bumper 108 substantially at the same time that foot 89 engages bumper 87 whereby the upper and lower ends of the blade member 64 will be generally simultaneously shifted to the left as viewed in FIGURE 2 to move the blade member from its extended position of FIGURE 2 toward its retracted position of FIGURE 1 to move the blade member out of engagement with weatherstrip 134 and past the flange 50 of weatherstrip 46.

As blade member 64 is shifted to the left as viewed in FIGURE 2, an ear 140 thereof will come into engagement with a rubber bumper 142, mounted on bracket 52 by a bracket 144, to limit further shifting movement of the blade member to the left and locate the blade member in its retracted position as shown in FIGURE 1 and in FIGURES 3 through 5, inclusive. A rubber bumper 146 mounted on the offset of ear 56 will also be engaged by the upper end of the blade as shown in FIGURE 3 to co-operate with bumper 142 in locating blade member 64. Thus, further counterclockwise movement of link 92 is prevented and wall 128 will thereafter move out of engagement with stud 114 as the bolt moves to a fully unlatched position as shown in FIGURE 1 wherein the wall 130 will be located closely adjacent to the stud 114. The blade member will remain in its retracted position due to the tension in spring 98. When the bolt 120 is in its fully unlatched position, either door 12 or 14 or both doors can be moved to an open position.

Assume now that both doors are in a closed and an unlatched position, as shown in FIGURE 1, and that the latch bolt 120 is moved from its unlatched position as shown in FIGURE 1 toward its latched position as shown in FIGURE 2. Upon initial movement of the bolt toward the latched position thereof, or clockwise as viewed in FIGURE 1, it can be seen that the wall 128 of guide 126 will move to the right with respect to stud 114 and that bell crank 92 will remain in its position as shown in FIGURE 1 during this initial movement of the bolt since the action of the spring 98 is greater than that of the springs 104 and 86 as previously described. Slightly after bolt 120 initially engages striker 124, the wall 128 of guide 126 will come into engagement with the stud 114 to start to swing the bell crank 92 clockwise about the pivot 94 thereof against the action of the spring 98. This movement of bell crank 92 will cause the upper end of the blade member 64 to be shifted to the right by the spring 104 and in turn will shift the link 82 upwardly to cause the lower end of the blade member to be simultaneously shifted to the right by the bell crank 68. During this shifting movement of the blade member, the other leg of the bell crank 92 remains in engagement with rubber bumper 108 and likewise foot 89 remains in engagement with the bumper 87. Thus, the blade member 64 will be shifted to the right into tight sealing engagement with the weatherstrip 134 as it wipes past flange 50 of weatherstrip 46. Once the blade member 64 is in tight sealing engagement with weatherstrip 134, it can no longer move to the right and thus further clockwise movement of bell crank 92 by bolt 120, as the bolt moves to fully latched position, cause the other leg of the bell crank 92 to move out of engagement with bumper 108, as spring 104 is tensioned, and likewise causes link 82 to shift upwardly to tension spring 86 as bumper 87 moves out of engagement with foot 89.

It can be seen that there is an initial delay between movement of the blade member from its retracted to its extended position upon movement of the bolt 120 from its unlatched to its latched position. This insures that doors 12 and 14 will be aligned before there is any movement of the blade member 64, since the partial latching engagement of the bolt 120 with the striker 124 will act to align the doors, if necessary.

Thus this invention provides an improved vehicle body closure sealing arrangement.

We claim:

1. The combination comprising, a vehicle body, a pair of closures swingably mounted on said body for movement between open and closed positions, latch means operable to latch said closures to each other or to unlatch said closures from each other to allow either or both to be moved between open and closed positions, sealing means mounted on one of said closures for movement between extended and retracted positions with respect thereto, said sealing means being located out of engagement with said other closure in the retracted position thereof to allow either or both of said closures to be moved between open and closed positions and being sealingly engageable with said other closure in the extended position thereof, and means responsive to operation of said latch means for moving said sealing means between said extended and retracted positions thereof.

2. The combination comprising, a vehicle body, a pair of closures swingably mounted on said body for movement between open and closed positions, latch means operable to latch said closures to each other or to unlatch said closures with respect to each other to allow either or both to be moved between open and closed positions, a compressible seal mounted on one of said closures, a rigid sealing member mounted on the other of said closures for movement between extended and retracted positions with respect thereto, said sealing member being located out of engagement with said compressible seal in the retracted position thereof and being sealingly engageable with said compressible seal in the extended position thereof, and means responsive to unlatching of said closures from each other for moving said sealing member from said extended to said retracted position thereof to allow either or both of said closures to be moved between open and closed positions.

3. The combination comprising, a vehicle body, a pair of closures swingably mounted on said body for movement between open and closed positions, latch means operable to latch and unlatch said closures with respect to each other, sealing means on one of said closures movable between extended and retracted positions with respect thereto, said sealing means being located out of engagement with said other closure in the retracted position thereof and being sealingly engageable with said other closure in the extended position thereof, means biasing said sealing means to said extended position thereof, means engageable by said sealing means for holding said sealing means in said retracted position against the action of said biasing means, and means responsive to latching of said closures to each other for moving said engageable means out of engagement with said sealing means to allow said biasing means to move said sealing means to said extended position thereof and to resiliently hold said sealing means in engagement with said other closure.

4. The combination comprising, a vehicle body, a pair of closures swingably mounted on said body for movement between open and closed positions, latch means operable to latch and unlatch said closures with respect to each other, sealing means on one of said closures movable between extended and retracted positions with respect thereto, said sealing means being located out of engagement with said other closure in the retracted position thereof and being sealingly engageable with said other closure in the extended position thereof, holding means engageable by said sealing means in the retracted position thereof, biasing means interconnecting said holding means and sealing means to bias said sealing means toward said extended position thereof and toward said holding means, said holding means being disengageable from said sealing means in the extended position thereof whereby said biasing means holds said sealing means in tight sealing engagement with said other closure, and means responsive to unlatching of said closures from each other for moving said holding means into engagement with said sealing means to move said sealing means to said retracted position thereof.

5. The combination comprising, a vehicle body, a pair of closures swingably mounted on said body for movement between open and closed positions, latch means operable to latch and unlatch said closures with respect to each other, sealing means on one of said closures movaable between extended and retracted positions with respect thereto, said sealing means being located out of engagement with said other closure in the retracted position thereof and being sealingly engageable with said other closure in the extended position thereof, holding means engageable by said sealing means in the retracted position thereof, biasing means interconnecting said holding means and sealing means to bias said sealing means toward said extended position thereof and toward said holding means, said holding means being disengageable from said sealing means in the extended position thereof whereby said biasing means holds said sealing means in tight sealing engagement with said other closure, and means responsive to operation of said latch means for moving said holding means into and out of engagement with said sealing means.

6. The combination comprising, a vehicle body, a closure swingably mounted on said body for movement between open and closed positions, latch means mounted on said closure for movement between latched and unlatched positions, sealing means mounted on said closure for movement between extended and retracted positions with respect thereto, holding means engageable by said sealing means in the retracted position thereof, biasing means interconnecting said holding means and sealing means to bias said sealing means toward said extended position thereof and toward said holding means, said holding means being disengageable from said sealing means in the extended position thereof, and means responsive to movement of said latch means to unlatched position for moving said holding means into engagement with said sealing means to move said sealing means to said retracted position thereof.

7. The combination comprising, a vehicle body, a closure swingably mounted on said body for movement between open and closed positions, latch means mounted on said closure for movement to latched and unlatched positions, sealing means mounted on said closure for movement between extended and retracted positions with respect thereto, holding means engageable by said sealing means in the retracted position thereof, biasing means interconnecting said holding means and sealing means to bias said sealing means toward said extended position thereof and toward said holding means, said holding means being disengageable from said sealing means in the extended position thereof, and means responsive to movement of said latch means for moving said holding means into and out of engagement with said sealing means.

8. The combination comprising, a vehicle body, a closure swingably mounted on said body for movement between opened and closed positions with respect to a body member, latch means mounted on said closure for movement to latched and unlatched positions, sealing means mounted on said closure for movement between extended and retracted positions with respect thereto and being engageable in the extended position thereof with said body member, holding means movably mounted on said closure, means on said sealing means engageable with said holding means, biasing means interconnecting said holding means and said sealing means to bias said sealing means toward said extended position thereof and hold said engageable means in engagement with said holding means in the retratced position thereof against the action of said biasing means, means operatively interconnecting said latch means and said holding means for moving said holding means relative to said closure, said holding means being movable out of engagement with said engageable means upon movement of said latch means to said unlatched position to allow said biasing means to move said sealing means to said extended position and resiliently hold said sealing means in engageemnt with said body member.

9. The combination comprising, a vehicle body, a closure swingably mounted on said body for movement between opened closed positions with respect to a body member, latch means mounted on said closure for movement to latched and unlatched positions, sealing means movable between extended and retracted positions with respect to said closure and being engageable in the extended position thereof with said body member, holding means movably mounted on said closure, means pivotally and slidably interconnecting said sealing means and said holding means to movably mount said sealing means on said body, means on said sealing means engageable with said holding means, biasing means interconnecting said holding means and said sealing means to bias said sealing means toward said extended position thereof and hold said engageable means in engagement with said holding means in the retracted position thereof against the action of said biasing means, means operatively interconnecting said latch means and said holding means for moving said holding means relative to said closure, said holding means being movable out of engagement with said engageable means upon movement of said sealing means to said extended position to allow said biasing means to resiliently hold said sealing means in engagement with said body member.

10. The combination comprising, a vehicle body, a closure swingably mounted on said body for movement between opened and closed positions with respect to a body member, latch means mounted on said closure for movement to latched and unlatched positions, elongated sealing means movable between extended and retracted positions with respect to said closure and being engageable in the extended position thereof with said body member, holding means movably mounted on said closure, means pivotally and slidably interconnecting said holding means and said sealing means adjacent one end thereof, means on said sealing means engageable with said holding means, biasing means interconnecting said holding means and said sealing means to bias said sealing means toward said exteded position thereof and hold said engageable means in engagement with said holding means in the retracted position thereof against the action of said biasing means, support means movably mounted on said body, means operatively interconnecting said support means and said sealing means adjacent the other end thereof, means interconnecting said support means and said holding means for movement of said support means upon movement of said holding means, means operatively interconnecting said latch means and said holding means for moving said holding means relative to said closure, said holding means being movable out of engagement with said engageable means upon movement of said sealing means to said extended position to allow said biasing means to resiliently hold said sealing means in engagement with said body member, and means disconnecting said interconnecting means from said support means upon disengagement of said engageable means from said holding means.

References Cited in the file of this patent

UNITED STATES PATENTS

| 1,558,954 | Walker | Oct. 27, 1925 |
| 1,681,869 | Meek | Aug. 21, 1928 |
| 2,171,070 | Raible | Aug. 29, 1939 |
| 2,765,504 | Laumann | Oct. 9, 1956 |
| 2,876,506 | Knebel | Mar. 10, 1959 |

FOREIGN PATENTS

| 484,095 | Germany | Oct. 10, 1929 |
| 384,630 | Great Britain | Dec. 8, 1932 |
| 406,613 | Great Britain | Mar. 1, 1934 |